United States Patent
Paulasaari et al.

(10) Patent No.: US 12,163,026 B2
(45) Date of Patent: Dec. 10, 2024

(54) POLYSILOXANE COMPOSITIONS AND USES THEREOF

(71) Applicant: Inkron Oy, Espoo (FI)

(72) Inventors: Jyri Paulasaari, Espoo (FI); Juha Rantala, Espoo (FI)

(73) Assignee: Inkron Oy, Espoo (FI)

( * ) Notice: Subject to any disclaimer, the term of this patent is extended or adjusted under 35 U.S.C. 154(b) by 898 days.

(21) Appl. No.: 17/261,039

(22) PCT Filed: Jul. 18, 2019

(86) PCT No.: PCT/FI2019/050552
§ 371 (c)(1),
(2) Date: Jan. 18, 2021

(87) PCT Pub. No.: WO2020/016485
PCT Pub. Date: Jan. 23, 2020

(65) Prior Publication Data
US 2021/0301136 A1 Sep. 30, 2021

(30) Foreign Application Priority Data
Jul. 18, 2018 (EP) ..................... 18184179

(51) Int. Cl.
| | |
|---|---|
| *C08G 77/16* | (2006.01) |
| *C08G 77/06* | (2006.01) |
| *C08J 9/28* | (2006.01) |
| *C08K 5/5419* | (2006.01) |
| *C08K 5/5425* | (2006.01) |
| *C08L 83/06* | (2006.01) |

(52) U.S. Cl.
CPC .............. *C08L 83/06* (2013.01); *C08G 77/06* (2013.01); *C08G 77/16* (2013.01); *C08J 9/28* (2013.01); *C08K 5/5419* (2013.01); *C08K 5/5425* (2013.01); *C08J 2383/06* (2013.01)

(58) Field of Classification Search
CPC ................................ C08G 77/16; C08L 83/06
USPC .................................................. 556/447, 449
See application file for complete search history.

(56) References Cited

U.S. PATENT DOCUMENTS

| | | | |
|---|---|---|---|
| 3,933,729 A | | 1/1976 | Letoffe |
| 3,989,667 A | * | 11/1976 | Lee ........................ C07F 7/0838 |
| | | | 528/31 |
| 5,010,115 A | * | 4/1991 | Grisoni ................... A61L 15/26 |
| | | | 521/154 |
| 2003/0064254 A1 | | 4/2003 | Eguchi et al. |
| 2011/0190415 A1 | | 8/2011 | Martin et al. |
| 2012/0027970 A1 | | 2/2012 | Irmer et al. |
| 2013/0116340 A1 | | 5/2013 | Furukawa et al. |
| 2017/0240780 A1 | | 8/2017 | Kramer et al. |

FOREIGN PATENT DOCUMENTS

| | | | |
|---|---|---|---|
| CN | 101137721 A | | 3/2008 |
| CN | 103209679 A | | 7/2013 |
| CN | 103897194 | * | 7/2014 |
| EP | 1559761 A1 | | 8/2005 |
| JP | 2002284997 A | | 10/2002 |
| JP | 2005216895 A | | 8/2005 |
| JP | 2007008915 A | | 1/2007 |
| JP | 2009540084 A | | 11/2009 |
| JP | 2016531905 A | | 10/2016 |
| JP | 2018501339 A | | 1/2018 |
| KR | 20130075428 A | | 7/2013 |
| WO | WO2007144452 A1 | | 12/2007 |
| WO | WO2011013611 A1 | | 2/2011 |
| WO | WO2011049246 A1 | | 4/2011 |
| WO | WO2014115974 A1 | | 7/2014 |

OTHER PUBLICATIONS

English language translation CH 103897194; Jul. 2014.*

* cited by examiner

*Primary Examiner* — Margaret G Moore
(74) *Attorney, Agent, or Firm* — Laine IP Oy

(57) ABSTRACT

A composition for a low refractive film, said composition comprising 10 parts by weight of a polysiloxane and 3 to 150 parts by weight of a volatile hydroxyalkylsilane. Based on the polysiloxane composition, films can be produced having a porous polysiloxane network and exhibiting a low refractive index of 1.4 or less and dielectric constant of 1.5 or less.

19 Claims, 2 Drawing Sheets

POLYSILOXANE COMPOSITIONS AND USES THEREOF

FIELD

The present invention relates to polysiloxane compositions capable of forming low refractive index films. In particular, the invention concerns a polysiloxane composition comprising a porous siloxane resin as well as films produced from such material. The present invention also concerns the uses of the compositions for example for producing anti-reflective coating films in light guide optics, dielectric stacks, resonator structures and in other optical apparatuses.

BACKGROUND

Low refractive index (RI) is an important property for anti-reflective (AR) films, light guide optics, dielectric stacks, resonator structures and other related applications. There are various types of low RI materials used today. The simplest is air which has the lowest known RI of conventional materials, the RI approaching 1.0. Air is sometimes used as air gaps in semiconductor devices, but since it lacks mechanical integrity it cannot support additional layers or structures.

As for solid low RI materials, fluorinated substances have historically been used as low RI coating. These include magnesium fluoride mineral and fluoroalkylated polymers and their refractive indices are typically between 1.3 and 1.4. Fluoroalkyl (PTFE, "Teflon") type materials also have low refractive index but suffer from poor adhesion in general.

Other common AR-coatings consist of porous $SiO_2$ nanoparticles prepared for example by so called Stöber process from tetraethylorthosilicate in aqueous ethanol solution in the presence of weak bases such as ammonia. These solutions give quite low RI films <1.25, but because they are essentially made of microscopical porous spherical nanoparticle powder instead of film forming polymeric solution, they lack structural integrity making it easy to wipe off the film even by bare fingers. Furthermore, these films tend to have a maximum film thickness below 1 μm due to low cracking threshold making their applications very limited.

Another RI technology involves blending of hollow silica nanoparticles with appropriate binder. Although low refractive index can be achieved by minimizing the amount of the binder in these mixtures, the materials often suffer from unacceptably high haze caused by the light scattering from the hollow particles.

According to theory and Fresnel equations, a quarter-wave-length anti-reflective coating has thickness equaling to λ/4 where λ is the wavelength of the light in the AR-medium and the optimal RI of the AR-medium is square root ($\sqrt{}$) of the RI of the substrate. For example, sodalime glass has an RI of 1.52 so the optimal AR-coating has an RI of $\sqrt{1.52}=1.23$ and thickness for green light (550 nm) 550/1.23/4=112 nm. As for quartz, the RI=1.45 and magnesium fluoride $MgF_2$ the RI=1.37. The best performing AR-coatings should have an even lower RI of 1.20 and RI of 1.17, respectively. For the purpose of anti-reflective coating, it would require material that has an RI lower than 1.3, preferably lower than 1.2, and that it could be deposited as thin films.

Low-RI films are also used in LCD-screens where red and green colors of a wide color gamut RGB-display are made using color specific quantum dots (QD) on top of a blue back light. Quantum dots in general are expensive, so QD-layer is preferentially sandwiched between two low RI (RI<1.25) resonator layers. This arrangement effectively increases the optical density of the QD well structure layer which can this way be then made thinner (FIG. 1).

Various polysiloxane coatings useful as anti-reflective films are known in the art.

KR20130075428A discloses a coating film with low reflection and high hardness, high transmittance and base refraction by having a porous silica nanolayer with a nanolayer structure. The coating has a porous silica nanolayer structure in the form of a network of polysiloxane and silica hybrid for high hardness. The material has micropores and low refractive index less than 1.3 which can be modulated with ratio of silica and air volume.

WO2011013611A1 discloses a photosensitive resin composition which can be cured by means of active energy rays. The photosensitive composition can provide a cured product which exhibits high hardness, and excellent scratch resistance, adhesion, chemical resistance, stain resistance and transparency, and which has a low refractive index. Further, the film is made of photosensitive resin composition in the form of hard coating film which can be prepared by curing the resin composition, the resin composition comprising a polyfunctional (meth) acrylate having at least three (meth) acryloyl groups in the molecule, colloidal silica that has a nanoporous structure with a mean particle diameter of 1 to 200 nm, and a (meth) acryloyl-containing polysiloxane, and a photo-radical polymerization initiator.

EP1559761A1 discloses a coating solution for forming a porous film having good mechanical strength and dielectric properties and for easily forming a film with a freely controlled film thickness in an ordinarily employed method in semiconductor process. The porous-film composition comprises polysiloxane, silica or zeolite particles.

As will appear, the refractive indices of the known materials are still rather high. Further, small-sized inorganic particles used in the known material are always present as mixtures of particles having varying sizes. When such particles are blended with polymers, compositions obtained which give rise to films having uneven microstructure and porosity. This causes variation in film quality in particular when producing films having thicknesses in the micron range. Further, there is no teaching in the art how to tailor materials which can be used for achieving anti-refractive films on different kinds of substrates, including both glass and polymeric substrates.

SUMMARY OF THE INVENTION

It is an object of the present invention to provide novel compositions for preparing low refractive coating films.

It is another object of the present invention to provide novel low refractive index films which can be prepared as layers having a thickness in the supra-micron range.

It is a third object of the present invention to provide methods of producing low refractive films.

It has surprisingly been found that films having good properties in terms of low refractive index and optionally also low dielectric constant can be obtained by providing siloxane compositions which, in addition to polysiloxane components, contain mixed therewith hydroxyalkylsilanes which are capable of being evaporated off by heating of the composition. Thus, by heating of such compositions during the process of curing the polysiloxane component for forming polysiloxane resin films, porous polysiloxane films or layers can be obtained. Typically, the materials comprise, based on 10 parts by weight of siloxane, 3 to 150 parts by weight of hydroxyalkylsilane.

In one embodiment, siloxane compositions are produced by providing siloxane polymers for example by conventional hydrolysis and condensation polymerization of silane monomers to yield a non-crosslinked polysiloxane polymer, and mixing the polysiloxanes with hydroxyalkylsilanes which are capable of at least partially dissolving the non-crosslinked polysiloxanes optionally together with a non-polar solvent for the non-crosslinked polysiloxane.

The hydroxyalkylsilanes are selected such that they can be evaporated off during the heating of the compositions to form a porous polysiloxane film on a substrate.

The hydroxyalkylsilanes selected mostly have a boiling point of 70° C. or more, but typically no higher than 250° C., in particular at least 80° C., at a pressure of up to 1 mbar. Preferably they have no side groups attached to the silicon atom(s) that are capable of undergoing hydrolysis or condensation under curing conditions. Such materials are referred to as "volatile" compounds in the present context.

The evaporation of the volatile components will create a porous polysiloxane structure having properties of low refractive index and low dielectric constant. Typically, the porous polysiloxane resins can give a material having a refractive index of 1.4 or less, for example 1.3 or less and a dielectric constant of 1.5 or less, for example 1.4 or less.

The present compositions can be used in the form of coating in anti-reflective films, light guide optics, dielectric stacks, resonator structures and other optical apparatuses.

More specifically, the present invention is characterized by what is stated in the characterizing portion of the independent claims.

Considerable advantages are obtained by the invention. Refractive indices as low as 1.06 can be achieved with the present compositions by using spin-on techniques for producing films, said spin-on being carried out with a spinner and a hotplate or even oven. The polysiloxane polymer can be cured and hardened before the hydroxyalkylsilane is evaporated away, leaving behind a nanoporous structure.

By further incorporating components, such as linear short chain polysiloxanes, working as flexibilizers, crack-free films can be provided which have a thickness of at least 3.5 µm in combination with a refractive index of less than 1.4 and optionally a dielectric constant lower than 1.5.

Further, the present compositions are capable of producing films which have the mechanical integrity required for the above mentioned applications.

The hydroxyalkylsilane was unexpectedly found to have good compatibility with polysiloxanes. Hydroxyalkysilane offers good wetting properties due to low surface tension and low shrinkage. Furthermore, when the hydroxy group in hydroxyalkysilane is tertiary, it does not couple at all with the silanol groups of the polymer but rather vaporizes away cleanly. The haze of the film is low due to the fine distribution of the porosity. The film can withstand heat up to 800° C. without collapsing the porosity and change in RI so it has excellent thermal stability.

By selecting the length of the alkyl-part of the hydroxyalkyl group, the evaporation rate of the hydroxyalkylsilanes can be adjusted to meet the thermal properties of the substrate. Many plastics for example, can only be cured below 130° C. without deformation, so the alkyl chain can be short, while inorganic substrates, such as glass, can be cured at higher temperature, so the length of the alkyl part can be long.

Further features and advantages of the present technology will be discussed more closely in the following with reference to a number of embodiments.

EMBODIMENTS

Figure 1:
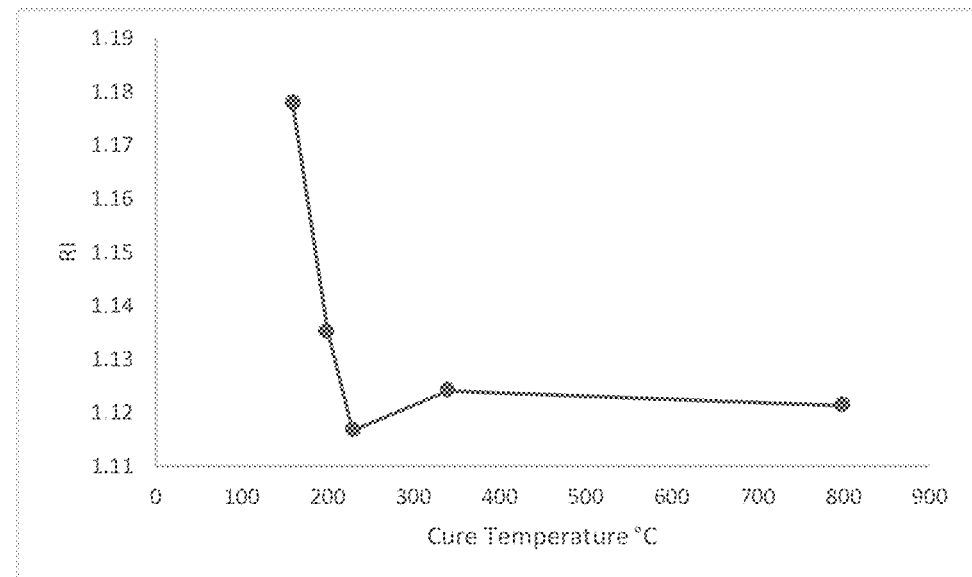
FIG. 1 shows in schematic fashion the structure of an LCD screen where red and green colors of a wide color gamut RGB-display are made using color specific quantum dots (QD) on top of a blue back light.

As discussed above, the present technology relates to polysiloxane compositions which generally comprise, based on 10 parts by weight of a polysiloxane, 3 to 150 parts, for example 5 to 100 parts, by weight of a hydroxyalkylsilane which can be evaporated off during processing of the compositions for forming polysiloxane films. Thus, in embodiments of the present technology, the hydroxyalkylsilanes have a boiling point in the temperature range used for the curing of the polysiloxane films. Generally, the hydroalkylsilane has a boiling point of at least 80° C. In embodiments, the hydroxyalkylsilanes have a boiling point in the range of 80 to 250° C., in particular 80 to 180° C. or 100 to 150° C., at a pressure of 1 mbar or less. Typically, the pressure ranges from 0.001 to 0.5 mbar, in particular 0.01 to 0.1 mbar.

The materials produced have low refractive indices and low dielectric constants and they are porous, in particular nano-porous.

In one embodiment, the polysiloxane composition comprises, based on 10 parts by weight of a polysiloxane, 1 to 150 parts, in particular 2 to 100 parts, for example 5 to 50 parts by weight of an α,ω-bis(hydroxy)-oligo(alkylsiloxane).

In one embodiment, the polysiloxane composition comprises, based on 10 parts by weight of a polysiloxane, 3 to 150 parts, for example 5 to 100 parts, in particular 10 to 80 parts by weight of a hydroxyalkylsilane having a boiling point of at least 80° C. at a pressure of up to 1 mbar and 1 to 150 parts, in particular 2 to 100 parts, for example 5 to 50 parts by weight of an α,ω-bis(hydroxy)-oligo(alkylsiloxane).

In the above embodiments, the term "alkyl" generally stands for a linear or branched, cyclic or alicyclic aliphatic alkyl groups having up to 30 carbon atoms, typically up to 25, for example up to 20. Examples include optionally substituted linear $C_1$-$C_{10}$ alkyl groups, branched $C_3$-$C_{10}$ alkyl groups, cyclic or alicyclic $C_3$-$C_{10}$ alkyl groups. The alkyl chains may contain unsaturation for example in the form of double or triple bonds.

In the "hydroxyalkylsilane" and "oligo(alkylsiloxane) groups", each silicon atom can contain two or more alkyl groups.

"Oligo" stands for 3 to 20, in particular 3 to 15, for example 4 to 10 groups.

In order to obtain low, or even "ultra-low", refractive index and a low, or even "ultra-low", dielectric constant coating film according to an embodiment of the present invention a porous, a layered, porous structure is provided which exhibits a polysiloxane-silica hybrid network and a plurality of pores having an average pore size in the nanometer range. I.e. the pores of the material are predominantly of a largest inner diameter of less than 1000 nm, typically about 50 to 950 nm, e.g. 100 to 900 nm or 150 to 750 nm. Such porous films or layers contain air inside to pores and they exhibit refractive indices and typically also low dielectric constant, even approaching that of air itself. The refractive index is generally below 1.5 and the dielectric constant below 1.5.

The refractive index of the films can be measured in a conventional way, for example with a Woollam ellipsometer (e.g. a Woollam spectroscopic ellipsometer) at a wave length of about 600 nm or more, for example at 632.9 nm (i.e. about 633 nm).

Average molecular weights are given as weight average molecular weights, or abbreviated "$M_W$".

In one embodiment, the porous polysiloxane layer has an air content of more than 30% by volume, in particular more than 40% by volume, for example at least 60% or more. Further the polysiloxane layer has a refractive index of 1.4 or less, depending on the polysiloxane-to-air volume ratio.

In one embodiment, the hydroxyalkylsilane comprises non-hydrolyzable hydrocarbyl groups attached to the silicon atoms of the silane.

The following structure illustrates the siloxane polymer as represented by Formula I.

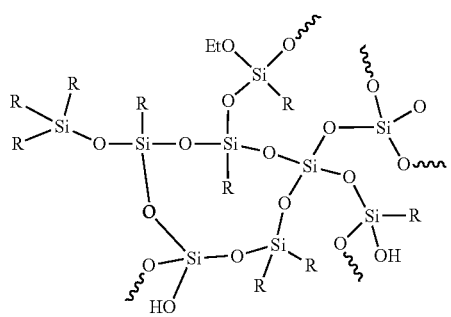

wherein
each of R independently presents hydrocarbyl radicals which is a linear $C_1$-$C_{10}$ alkyl groups, branched $C_3$-$C_{10}$ alkyl groups, and aryl groups having 5 to 20 carbon atoms, said aryl groups optionally being mono-, di-, tri- or polysubstituted by alkyl groups having 1 to 10 carbon atoms, and the wiggly lines represent residues of siloxane chains optionally substituted.

In embodiments of the present technology, the terms "short" and "long", respectively used for designating the length of alkyl chains, linear or branched, typically stand for 1 to 6 carbon atoms (in case of "short chains") and 7 to 30 carbon atoms (in case of "long chains").

In some embodiments, the hydroxyalkylsilanes have the structures of Formula II:

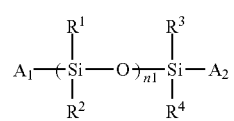

wherein
$A_1$ and $A_2$ are tertiary hydroxyalkyl chains independently selected from $C_6$-$C_{30}$ linear or branched alkyl groups, which optionally contain 1 to 3 double or triple bonds, and which have at least one tertiary hydroxyl group;
n1 is an integer from 0 to 10; and
$R^1$, $R^2$, $R^3$, $R^4$ are independently selected from linear $C_1$-$C_{10}$ alkyl groups, branched $C_3$-$C_{10}$ alkyl groups, and aryl groups having 5 to 20 carbon atoms, optionally monosubstituted, disubstituted or trisubstituted with a group selected from $C_1$-$C_{10}$ alkyl groups, branched $C_3$-$C_{10}$ alkyl groups, $C_3$-$C_{10}$ alicyclic groups; and
in other embodiments, the hydroxyalkylsilanes have the Formula III

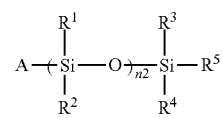

wherein
A stands for a linear or branched alkyl chain having 6 to 30 carbon atoms, optionally having 1 to 3 double or triple bonds, and further comprising at least one tertiary hydroxyl group,
n2 is an integer from 0 to 10; and
$R^1$, $R^2$, $R^3$, $R^4$, and $R^5$ are independently selected from linear $C_1$-$C_{10}$ alkyl groups, branched $C_3$-$C_{10}$ alkyl groups, and aryl groups having 5 to 20 carbon atoms, optionally monosubstituted, bisubstituted or trisubstituted with a group selected from $C_1$-$C_{10}$ alkyl groups, branched $C_3$-$C_{10}$ alkyl groups, $C_3$-$C_{10}$ alicyclic groups;

In one embodiment, the hydroxyalkylsilanes of Formulas II and III, respectively, have boiling points of at least 80° C., in particular 100° C., or higher (for example 105° C. or higher and up to 180° C.) at a pressure of 1 mbar or less.

In one embodiment, the present compositions contain hydroxyalkylsilanes of both Formula II and Formula III.

It should be pointed out that the molecules of Formulas II and III are, for the sake of brevity, given the designation "hydroalkylsilanes" although, depending on the value of the symbols n1 and n2, they may also contain a "siloxane" residue.

There are typically no side groups attached to the silicon atom(s) that are capable of undergoing hydrolysis or condensation under curing conditions.

The hydroxyalkylsilane, such as a compound of Formulas II and/or III, has unexpectedly been found to have good compatibility with polysiloxanes. The hydroxyalkylsilane offers good wetting properties likely due to the low surface tension of silanes in general. The hydroxyalkylsilane(s) will work as solvent or dispersing agent for the polysiloxane prepolymer obtained after hydrolysis and condensation of the silane monomer(s).

Furthermore, when the hydroxy group in hydroxyalkysilane is tertiary, it does not couple with the silanol groups of the polymer but vaporizes away cleanly. The haze of the film is low or undetectable due to the fine distribution of the porosity. The film formed can withstand heat up to 800° C. without collapsing the porosity so that it has excellent thermal stability.

In one embodiment, the alkyl residues A and A1 and A2 of the above formulas II and III contain from 8 to 25 carbon atoms, for example 10 to 20.

In one embodiment, the hydroxyalkyl-group of the hydroxyalkylsilane comprises at least 10 carbon atoms, for example at least 15 carbon atoms, to achieve a boiling temperature of at least 100° C. at a pressure of 1 mbar or less, for example 0.01 to 0.1 mbar.

In a preferred embodiment, the hydroxyalkylsilane comprises non-hydrolysable hydrocarbyl radicals, preferably alkyl or aryl groups ($R^1$ to $R^5$), attached to the silicone atoms of the silane.

In one embodiment, the polysiloxane resin is a prepolymer having an average molecular weight ($M_W$) of 500 to 10,000,000 g/mol, in particular 1,000 to 1,000,000 g/mol, for example 5,000 to 100,000 g/mol, or 20,000 to 50,000 g/mol (measured by GPC against a polystyrene standard). The prepolymer comprises a polysiloxane obtained by hydrolysis and condensation or co-condensation of a silane monomer or of mixtures of silane monomers.

In the present context, the term "prepolymer" is used for designating a polysiloxane which can still be cured or cross-linked. Thus, the term "prepolymer" also denotes that the polysiloxane is "non-cross-linked", i.e. it is capable of undergoing a cross-linking reaction for achieve a hardened, i.e. cured, structure.

In one embodiment, at least one of the silane monomers has the Formula IV,

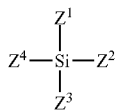

wherein $Z^1$, $Z^2$, $Z^3$ and $Z^4$ are independently selected from hydrolysable groups, in particular of hydrolysable groups of the group consisting of methoxy, ethoxy, propoxy group, chlorine or acetoxy group, said groups $Z^1$, $Z^2$ and $Z^3$ optionally being one, two or all three groups substituted by a non-hydrolyzable group selected from $C_1$-$C_{10}$ alkyl groups, branched $C_3$-$C_{10}$ alkyl groups, $C_3$-$C_{10}$ alicyclic groups and corresponding groups containing unsaturation, such as 1 to 3 double or triple bonds, for example $C_2$-$C_{10}$ alkenyl groups, or aryl groups having 5 to 20 carbon atoms. A non-exhaustive list of examples of non-hydrolyzable groups comprises methyl, ethyl, propyl, vinyl, phenyl, dimethylphenyl, trimethylphenyl, tetramethylphenyl, naphthyl and diethylphenyl groups.

Examples of suitable silane monomers include tetraethoxysilane, tetramethoxysilane, methyltrimethoxysilane, methyltriethoxysilane, dimethyldimethoxysilane, dimethyldiethoxysilane, trimethylmethoxysilane, vinyltrimethoxysilane, glycidoxypropyltrimethoxysilane, phenyltrimethoxysilane, methacryloxypropyltrimethoxysilane, among others.

In embodiments, invention, the polysiloxane compositions contain in addition to polysiloxane polymer and hydroxyalkylsilanes also compound(s) which work as flexibilizers. In the present context, a "flexibilizer is a polymer additive that enhances the cracking threshold of a polymer film.

According to one embodiment, the flexibilizer comprises one or more hydroxy-oligo(dialkylsiloxane) such as α,ω-bis(hydroxy)-oligo(dimethylsiloxane) having 1 . . . 20 silicon atoms.

In one embodiment, polysiloxane films having a thickness of at least 10 nm, for example at least 50 nm, in particular 100 nm to 25 μm, for example 500 nm to 5 μm, are provided, said film being obtained by evaporating off the hydroxyalkylsilane for forming a porous siloxane film. Typically, the porosity is "nanoporous" which means that the average pore sizes (larges diameter) is less than about 1000 nm, in particular less than 800 nm, for example less than 500 nm, or less than 200 nm or less than 100 nm.

In one embodiment, the flexibilizer allows the preparation of polymer films containing porous polysiloxane, having a thickness of 3.5 μm or more, typically up to about 15 μm, while yet not suffering from cracking. Such films have a low refractive index 1.4 or below, for example a refractive index of 1.03 to 1.25, and dielectric constant of 1.5 or below, in particular 1.2 to 1.25.

In one embodiment, the α,ω-bis(hydroxy)-oligo(alkylsiloxane) has the Formula V.

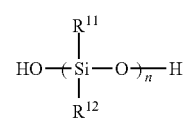

wherein n is an integer from 1 to 20, for example 3 to 20, and $R^{11}$ and $R^{12}$ are independently selected from linear $C_1$-$C_{10}$ alkyl groups, branched $C_3$-$C_{10}$ alkyl groups, and aryl groups having 5 to 20 carbon atoms, said aryl groups optionally being mono-, di-, tri- or polysubstituted by alkyl groups having 1 to 10 carbon atoms. The alkyl chains may contain unsaturation for example in the form of double or triple bonds.

The alkyl groups in formula V may contain unsaturation in the form of 1 to 3 double or triple bonds, in particular in a linear chain of 3 to 10 carbon atoms.

Spin coating is one method used in forming a coating which is suitable for use to deposit uniform thin films comprising polysiloxane resins and hydroxyl-alkyl-silanes to flat substrates. A small amount of coating material is applied on the center of the substrate, which is either spun at low speed or not spun at all. When the substrate is rotated at high speed the spinner spreads the coating material by centrifugal force. The spun material is subjected to heating to evaporate off the spin casting solvents. Other suitable application methods include dip coating, spray coating, slit and slot coating, among others.

According to an embodiment, after evaporation off of the spin casting solvent, the material deposited on the substrate is subjected to curing by increasing the temperature required to achieve cross-linking of the polysiloxane material so as to provide a cured, solid polysiloxane layer. The temperature of the curing step is typically in the range of 70 to 280° C. The pressure can be reduced or ambient pressure. For polymeric substrates temperatures in the range from about 70 to 150° C. are typically employed whereas for glass substrates temperatures in the range of 150 to 280° C. are typically used.

The hydroxyalkylsilanes are, in one embodiment, selected from materials, in particular from materials according to Formulas II or III, having a boiling point 80° C. or more at a pressure of up to 1 mbar. A porous polysiloxane film of thickness up to 3.5 μm is formed when the spun material is subjected to heating for curing the film. Thus, by heating the film at 70 to 280° C. curing of the polysiloxane prepolymer will be achieved but also evaporation off of the hydroxyalkysilane. Since the hydroxyalkylsilane is only removed after at least partial curing of the siloxane polymer has been reached a non-collapsible porous structure will be reached. The flexible linear short chain hydroxyl-terminated polysiloxanes prevent cracks from forming so at the same time with the hydroxyalkylsilane it provides for both ultra-low RI and ultra-low dielectric constants at films having a thickness of 1 μm or more without cracking. If needed, a double coating is also possible.

In one embodiment, hydroxyalkylsilanes are employed which evaporate off (or distil off) at 70 to 250° C. at an absolute pressure of 0.01 to 0.1 mbar. With such hydroxyalkylsilanes the gas, typically air, used for purging the surface of the spinning substrate, which pick up the hydroxyalkylsilane evaporating from the film which is being formed on the substrate a conduct it away. Usually removal of the hydroxyalkylsilane will be complete within 2 to 90 seconds, in particular 3 to 60 seconds.

In another embodiment the composition further comprises a spin casting solvent at a concentration of 10 to 99.9%, preferably 20 to 99% by weight of the total composition.

In one embodiment, the solvent is selected from the group of polar or non-polar solvents, protic solvents or aprotic solvents. A non-exhaustive list of examples of solvents include volatile alkane, alkene, aromatic, alcohol, ester, ether, ketone solvents, and short chain linear, branched or cyclic dimethylsilicones having boiling point between 30-300° C. at ambient pressure. Preferably, the solvent is a mixture of t-amyl alcohol, methyl isobutyl carbitol, methyl isobutyl ketone and octamethyltrisiloxane.

In another embodiment the composition further comprises 0.001 to 10% by weight curing catalyst selected from thermo or light induced radical catalyst, tin or platinum containing catalyst, alkaline or alkaline releasing catalysts, acid catalyst or thermo or light releasing acid catalyst, or fluorine ion releasing catalysts.

Another embodiment provides for the composition further comprising 0.001 to 10% by weight surfactant selected from fluorosurfactant, siloxane surfactant, non-ionic surfactant, anionic or cationic surfactant or zwitterionic surfactant.

The compositions of the invention have a large field of application. The can be used as a low-RI layer in dielectric stacks or light guide applications, as well as antireflective coatings in optical devices and coatings of nanoparticles and phosphor particles. These compositions can also be used as low dielectrics film in semiconductor devices. Use of the compositions as low dielectric films or low-RI films in combination with a capping layer is also foreseen.

The following non-limiting examples illustrate embodiments of the present invention.

The refractive indices of the films have been measured on a Woollam spectroscopic ellipsometer at 632.9 nm.

Example 1

Methanol (800 g), DI-water (300 g) and tetramethylammonium hydroxide (TMAH, 25% water solution, 22 g) were heated to boiling. Tetraethylorthosilicate (TEOS, 130 g) and methyltriethoxysilane (MTEOS, 110 g) were poured slowly in while stirring. The reaction was allowed to proceed for 20 minutes, after which it was cooled down to +4° C. for neutralization with saturated aqueous maleic acid solution (40 g). Most of the methanol was evaporated under reduced pressure, after which methyl tert-butyl ether (MTBE, 1000 mL) and DI-water (500 mL) were added resulting in a two-phase system. The water phase was discarded while the upper organic layer is further washed three times with DI-water. Volatiles were then evaporated until an approximately 12% solution is obtained. It was further diluted to 8 wt-% by adding methyl isobutyl ketone and filtered through a 0.45μ PTFE filter, and then stored in freezer.

The reaction scheme of the hydrolysis and condensation reaction is the following:

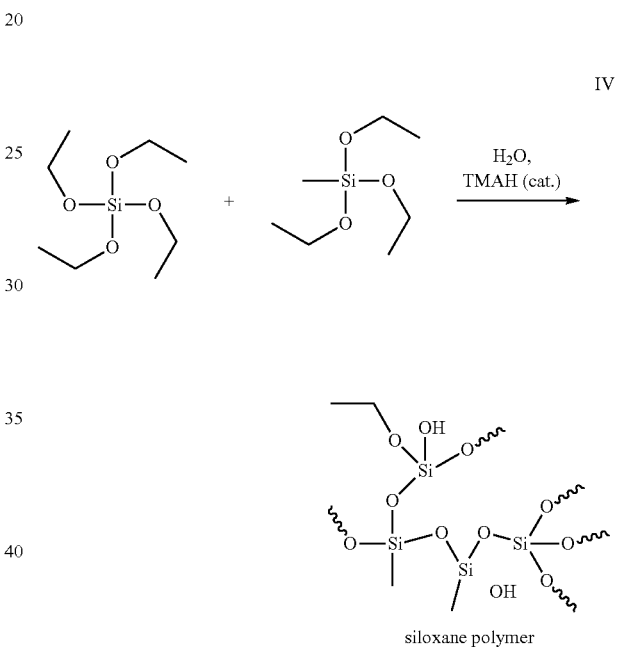

The wiggly lines represent residues of siloxane chains optionally substituted.

By the procedure of Example 1, siloxane polymers typically having a molecular weight of about 20,000 to 50,000 g/mol can be produced.

Example 2

3, 7, 11, 15-Tetramethyl-1-hexadecen-3-ol (100 g) and pentamethyldisiloxane (100 g) are placed in a 500 mL round bottom flask with a magnetic stirrer. Platinum-divinyltetramethyldisiloxane complex (2% xylenes solution) is added to catalyze hydrosilylation at room temperature for 24 hours. The product is then distilled under high vacuum at 180° C./0.1 mbar to yield clear transparent viscous liquid (1-(3'-hydroxy-3',7',11',15'-tetramethylhexadecyl)-1,1,3,3,3-pentamethyldisiloxane, iPhPMDS, 189 g.

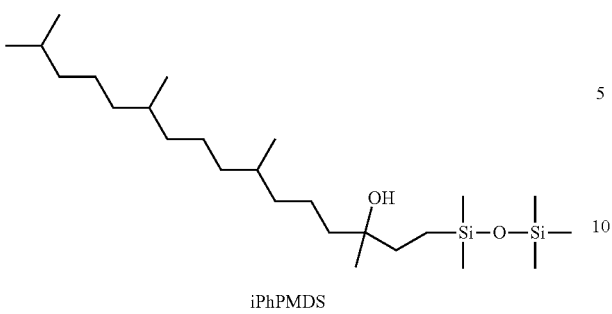

iPhPMDS

Example 3

3, 7, 11, 15-tetramethyl-1-hexadecen-3-ol (2 g) and triethoxysilane (1.2 g) are placed in a 20 mL glass vial. Platinum-divinyltetramethyldisiloxane complex (2% xylenes solution, 1 drop) is added to catalyze hydrosilylation. After exotherm reaction is over, GC/MS is run and one peak which corresponds to cyclicized form 5-methyl-5-(4', 8', 12'-trimethyltridecyl)-1-oxa-2,2-diethoxy-2-silacyclopentane (iPh-c-DEOS) is observed. LC/GPC showed two other smaller peaks non-detectable by GC/MS. Based on molecular weight they are estimated to be dimeric and trimeric species.

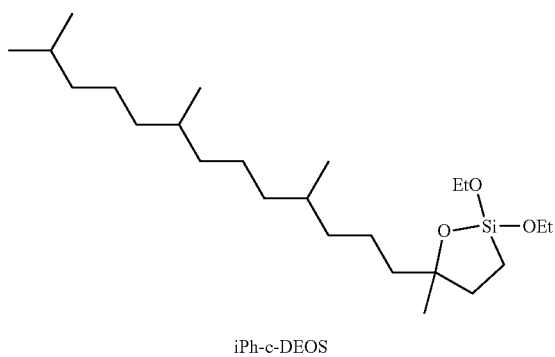 [SMILES: CCO[Si]1(OCC)CCC(C)(CCCC(C)CCCC(C)CCCC(C)C)O1]

iPh-c-DEOS

Example 4

Linalool (31 g), pentamethyldisiloxane (30 g) and 2% Karsted-Pt solution (0.2 g) are stirred for 20 hours at room temperature. The solution is vacuum distilled at 100° C./0.1 mbar to yield the product 1-(3'-hydroxy-3',7'-dimethyloct-6'-enyl)-1,1,3,3,3-pentamethyldisiloxane (LinaPMDS), 58 g.

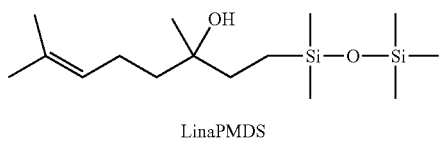 [SMILES: CC(C)=CCCC(C)(O)CC[Si](C)(C)O[Si](C)(C)C]

LinaPMDS

Example 5

Linalool (31 g), tetramethyldisiloxane (13.4 g) and 2% Karsted-Pt solution (0.2 g) are stirred for 20 hours at room temperature. The solution is vacuum distilled at 185° C./0.1 mbar to yield the product 1,3-bis(3'-hydroxy-3',7'-dimethyl-oct-6'-enyl)-1,1,3,3-tetramethyldisiloxane (Lina2TMDS), 41.1 g.

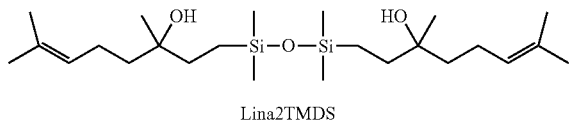 [SMILES: CC(C)=CCCC(C)(O)CC[Si](C)(C)O[Si](C)(C)CCC(C)(O)CCC=C(C)C]

Lina2TMDS

Example 6

5×iPhPMDS+3× flexibilizer: 10 g of 8% polymer solution (=0.8 g dry polymer) from Example 1 was taken and mixed with 2.4 g DMS-S12® (short chain silanol terminated pdms from Gelest Inc.) and iPhPMDS (4 g) from Example 2. The solution was filtered through a 0.45 μm PTFE filter and spin cast at 600 rpm/30 s. The film is cured at 230° C./5 min+250° C./15 min. Another layer is spin casted and cured similarly on top of the first layer, yielding a total 3.5 μm ultra-low refractive film with refractive index of 1.23. The film was clear and crack-free.

Example 7. Forming an Ultra Low Refractive Index Film Containing LinaPMDS

10×LinaPMDS: 10 g of 8% polymer solution from Example 1 was taken and mixed with LinaPMDS (8 g) from Example 4. The solution was filtered through 0.45 μm PTFE filter and was spin cast at 1000 rpm/30 s. The film was cured at various temperatures from 150° C. to 800° C. to see the effect of curing temperature to film RI. As can be seen from FIG. 1, all temperatures gave refractive index (RI) >1.2, and a minimum of RI=1.115 was reached at 230° C. The films had haze values of less than 0.15 indicating good clarity and low haze.

FIG. 1 shows the effect of the curing temperature on the refractive index.

Example 8. Forming an Ultra Low Refractive Index Film Containing LinaPMDS and iPhPMDS and Various Curing Temperatures 10×Lina2PMDS or 10×iPhPMDS: 2×10 g of 8% polymer solution from Example 1 is taken and mixed with both Lina2PMDS (8 g) and iPhPMDS (8 g) separately. The solutions are filtered through a 0.45 μm PTFE filter and spin casted at 1000 rpm/30 s. The film is cured at various temperatures from 230° C. to 800° C. to see the effect of curing temperature on RI film. As can be seen from table below, all temperatures gave a refractive index >1.11 and the lowest RI was 1.05857 with iPhPMDS cured at 230° C./30 min+800° C./5 min. The porosity of the film did not collapse at high temperature. SEM-image revealed good and homogenous pore nanostructure. The dielectric constant of the film was found to be 1.41.

TABLE 1

Refractive index of the film made of siloxane polymer and a 10-fold amount of porogen.

| (Film Tx 1 . . . 2 μm) | Lina2TMDS 10x | iPhPMDS 10x |
|---|---|---|
| 230° C./30 min | 1.10547 | 1.07512 |
| 340° C./30 min | 1.08035 | 1.06460 |
| 340° C./30 min + 800° C./5 min | NM | 1.05857 |

Figure 2:
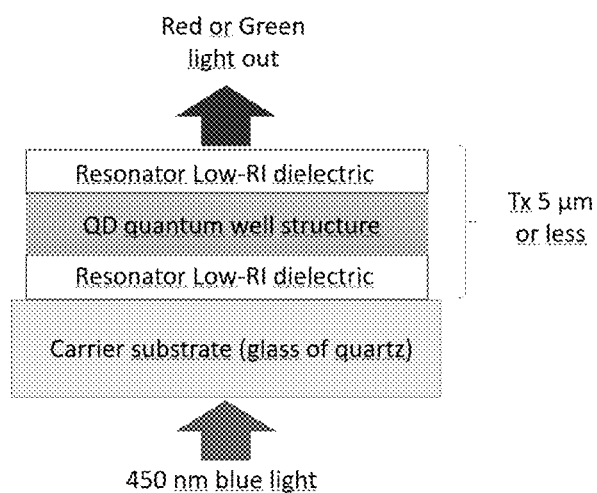
FIG. 2 shows the effect of the curing temperature on the refractive index of the materials of Example 7.
Figure 3:
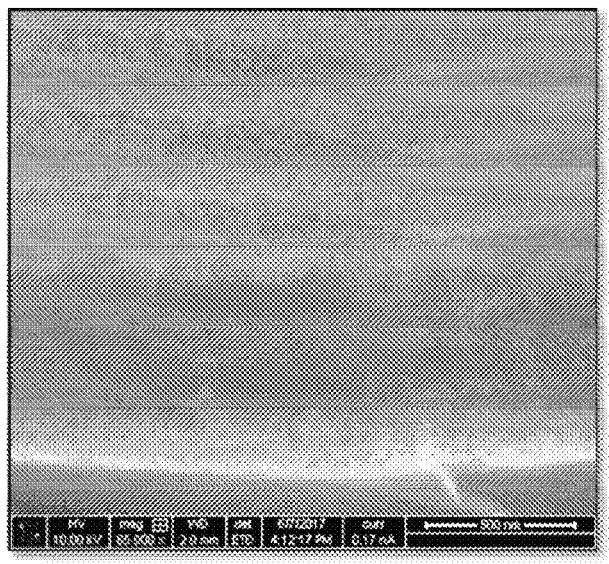
FIG. 3 is an SEM image of films having an RI of 1.08, prepared from a composition of 1 part siloxane polymer from Example 1 and 10 parts of (1-(3'-hydroxy-3',7',11',15'-tetramethylhexadecyl)-1,1,3,3,3-pentamethyldisiloxane, (iPhPMDS, Example 2), cured at 230° C./30 min.

FIG. 2 is an SEM image of an ultra-low RI film with an RI of 1.08, prepared as described above from a composition of 1 part siloxane polymer from Example 1 and 10 parts of (1-(3'-hydroxy-3',7',11',15'-tetramethylhexadecyl)-1,1,3,3,3-pentamethyldisiloxane, (iPhPMDS, Example 2), cured at 230° C./30 min.

Comparative Example 9. The Effect of Hydrolysable Groups of iPh-c-DEOS on the Refractive Index 5×iPh-c-DEOS: 10 g of 8% polymer solution from example 1 was taken and mixed with iPh-c-DEOS (4 g) from Example 3. The solution was filtered through 0.45 μm PTFE filter and was spin casted at 1000 rpm/30 s. The film was cured at 230° C./30 min. RI=1.38 was measured, indicating that hydrolysable groups at silicon atom of iPh-c-DEOS do not yield low RI film, but instead iPh-c-DEOS is likely incorporated permanently within the film and filling most nanopores thus destroying low RI property altogether.

Example 10—The Capping Layer Material

TEOS (100 g), MTEOS (200 g), Acetone (300 g), DI-water (100 g) and 60% $HNO_3$ (30 mg) were refluxed for 5 hours, after which triethylamine (75 mg) was added and refluxing continued for 48 hours until the molecular weight increased to 24,000 g/mol, as measured by GPC (in THF). The amine was neutralized by using formic acid (150 mg).

The solution (209 g) was further diluted with methyl isobutyl carbitol (890 g) and filtered through a 0.2μ PTFE filter to yield an about 3% w/w capping solution suitable for spin casting. A 150 μm film was spin coated and cured at 230° C. The film of the capping material had an RI=1.39. The capping material was used to seal the surface of the Low-RI nanoporous films to prevent the penetration of oligomeric components of subsequent layers into the pores.

Example 11—Low-RI Composition of Polymer, Hydroxyalkylsilane and Flexibilizer Low-RI polymer solution (8.62% solids, 1200 g) similar to Example 1 was formulated with hydroxyalkylsilane (iPhPMDS, 52 g, half the amount of the low-RI polymer) and short-chain dihydroxydimethylsiloxane (DMS-12 by Gelest Inc., 103 g (same amount as the low-RI polymer) and solvent (MIBC, 120 g). Film RI for a 1.8 μm film was 1.23 after cure at 230° C./10 min.

A sodalime glass plate (A) (10×10 cm, Tx=3 mm) was coated with a Low-RI film (Example 11, 1.8 μm, cured at 230° C./15 min). The surface was capped with the polymer from Example 10 (150 μm, cured at 230° C./1 h), followed by application of UV-curable commercial acrylate based clear optical adhesive (30 μm). The whole stack was finally coated with acrylate based black coating. A reference stack (B) was similarly created but with no Low-RI film nor a capping layer.

Figure 4:
FIG. 4 shows in side-view a photograph of two plates (A) and (B) in parallel, the plates being coated as explained in Example 11.

FIG. 4 shows in side-view a photograph of the two plates in parallel. As can be clearly seen from side of the two glass plates, the Low-RI film was effective in creating light guide effect in glass (A), while the reference stack (B) absorbed all the light that was lit from the opposite side.

Example 12

Methanol (800 g), DI-water (300 g) and tetramethylammonium hydroxide (TMAH, 25% water solution, 23 g) were heated to boiling. Tetraethylorthosilicate (TEOS, 130 g), methyltriethoxysilane (MTEOS, 110 g) and 4-hydroxy-4,4-bis(trifluoromethyl)-butyltriethoxysilane (30 g) were poured slowly in while stirring. The reaction was allowed to proceed for 20 minutes, after which the reaction mixture it was cooled in ice batch for neutralization with saturated aqueous maleic acid solution (40 g). Most of the methanol was evaporated under reduced pressure, after which methyl tert-butyl ether (MTBE, 1100 mL) and DI-water (600 mL) were added resulting in a two-phase system. The water phase was discarded while the upper organic layer was further washed three times with DI-water. Volatiles were then evaporated until an approximately 12% solution is obtained. It was further diluted to 8 weight-% by adding methyl isobutyl ketone and filtered through a 0.45μ PTFE filter, and then stored in freezer.

Example 13

The polymer solution from Example 12 (20 g) was mixed with iPhPMDS from Example 2 (1 g) and triarylsulfonium hexafluoroantimonate salt (UVI-6974, 30 mg). After spin casting the film was irradiated through a photo mask by a broad band mercury lamp (mostly 365 nm) and softbaked at 50° C./1 min. The pattern was developed using 2.38% TMAH solution. After cure at 230° C./1 h, followed by acetone rinse, film RI was found to be 1.22.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

The term "comprising" when used in the context of a composition also includes the limitations "consisting of" and "consisting essentially of".

Further aspects and embodiments of the invention are set out in the following numbered clauses.

1. A polysiloxane composition comprising polysiloxane and a hydroxyalkylsilane which is selected from hydroxyalkylsilanes having the Formula II

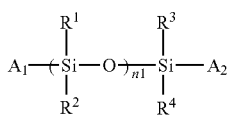

II wherein $A^1$ and $A^2$ are tertiary hydroxyalkyl chains independently selected from $C_6$-$C_{30}$ linear or branched alkyl groups, which optionally contain 1 to 3 double or triple bonds, and which have at least one tertiary hydroxyl group, n1 is an integer from 1 to 10, and $R^1$ and $R^2$ are independently selected from linear $C_1$-$C_{10}$ alkyl groups, branched $C_3$-$C_{10}$ alkyl groups, and aryl groups having 5 to 20 carbon atoms, optionally monosubstituted, disubstituted or trisubstituted with a group selected from $C_1$-$C_{10}$ alkyl groups, branched $C_3$-$C_{10}$ alkyl groups, $C_3$-$C_{10}$ alicyclic groups, and hydroxylalkylsilanes having the Formula III

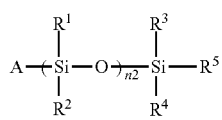

III wherein

A stands for a linear or branched alkyl chain having 6 to 30 carbon atoms, optionally having 1 to 3 double or triple bonds, and further comprising at least one tertiary hydroxyl group, n2 is an integer from 0 to 10; and $R^1$, $R^2$, $R^3$, $R^4$, and $R^5$ are independently selected from linear $C_1$-$C_{10}$ alkyl groups, branched $C_3$-$C_{10}$ alkyl groups, and aryl groups having 5 to 20 carbon atoms, optionally monosubstituted, disubstituted or trisubstituted with a group selected from $C_1$-$C_{10}$ alkyl groups, branched $C_3$-$C_{10}$ alkyl groups, $C_3$-$C_{10}$ alicyclic groups, and mixtures thereof.

2. The composition according to clause 1, wherein the composition further comprises an α,ω-bis hydroxyalkyl-oligo(alkylsiloxane), wherein the alkyl groups groups are selected from linear $C_1$-$C_{10}$ alkyl groups, branched $C_3$-$C_{10}$ alkyl groups and cyclic alkyl groups having 3 to 11 carbon atoms.

3. The composition according to clause 2, wherein the α,ω-bis(hydroxylalkyl)-oligo(alkylsiloxane) is a linear siloxane having Formula V

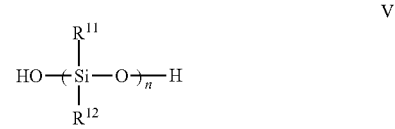

V wherein n is an integer from 1 to 20, in particular 3 to 20 and $R^{11}$ and $R^{12}$ are linear $C_1$-$C_{10}$ alkyl groups, branched $C_3$-$C_{10}$ alkyl groups, and aryl groups having 5 to 20 carbon atoms, the alkyl chains optionally containing unsaturation for example in the form of double or triple bonds.

4. The composition according to clauses 2 or 3, wherein the α,ω-bis(hydroxyalkyl)-oligo(alkylsiloxane) is a linear α,ω-bis(hydroxy)-dialkylsiloxane, having the Formula V, wherein n is an integer from 3 to 15, and $R^{11}$ and $R^{12}$ have the same meaning as in claim 6, in particular the α,ω-bis (hydroxyalkyl)-oligo(alkylsiloxane) is linear α,ω-bis(hydroxy)-dimethylsiloxane.

5. The composition according to any of the preceding clauses, comprising, based on 10 parts by weight of the polysiloxane, 3 to 150 parts, in particular 5 to 100 parts, for example 10 to 80 parts of a hydroxyalkylsilane having a boiling point of at least 80° C. at a pressure of up to 1 mbar.

6. The composition according to any of the preceding clauses, comprising, based on 10 parts by weight of a polysiloxane, 1 to 150 parts, in particular 2 to 100 parts, for example 5 to 50 parts by weight of the α,ω-bis hydroxyalkyl-oligo(alkylsiloxane).

7. The composition according to any of the preceding clauses, wherein the polysiloxane is a polymer having an average molecular weight ($M_W$) of 500 to 1,500,000, in particular 5,000 to 100,000 g/mol.

8. The composition according to any of the preceding clauses, wherein the polysiloxane is obtained by hydrolysis and condensation or co-condensation of silane monomers having Formula IV

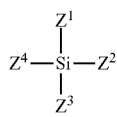

wherein $Z^1$, $Z^2$, $Z^3$ and $Z^4$ are independently selected from hydrolysable groups, in particular of hydrolysable groups of the group consisting of methoxy, ethoxy, propoxy group, chlorine or acetoxy group, said group $Z^1$, $Z^2$ and $Z^3$ optionally being one, two or all three groups substituted by a non-hydrolyzable group selected from $C_1$-$C_{10}$ alkyl groups, branched $C_3$-$C_{10}$ alkyl groups, $C_3$-$C_{10}$ alicyclic groups or aryl groups having 5 to 20 carbon atoms.

9. The composition according to clause 8, wherein at least two monomers of Formula IV are joined with a non-hydrolysable group selected from a divalent $C_1$-$C_{10}$ aliphatic or aromatic group.

10. The composition according to any of the preceding clauses, wherein the polysiloxane polymer has refractive index of no greater than 1.45, preferably 1.4 or less in particular 1.3 or less, such as 1.25 or less, measured at 632.9 nm.

11. The composition according to any of the preceding clauses, further comprising a solvent 1 to 99.9%, preferably 5 to 99% by weight of the total composition, wherein the solvent is selected from polar, non-polar solvents, protic solvents or aprotic solvents in alkyl, ester, ketone, ether or alcohol solvent types.

12. The composition according to any of the preceding clauses, wherein the hydroxyalkylsilane is free from side groups attached to the silicon atom(s) that are capable of undergoing hydrolysis or condensation under curing conditions.

13. The composition according to any of the preceding clauses, further comprising 0.001 to 10% by weight of one or more curing catalysts selected from the group of thermo and light induced radical catalysts, tin and platinum containing catalyst, alkaline and alkaline releasing catalysts, acid catalyst and thermo- or light-releasing acid catalysts, and fluorine ion releasing catalysts.

14. The composition according to any of the preceding clauses, wherein the hydroxyalkylsilane has a boiling point in the curing range of the polysiloxane, in particular a boiling point of 80° C. or more at a pressure of up to 1 mbar.

15. A method of producing a polysiloxane composition according to any of the preceding clauses, comprising
providing a non-crosslinked polysiloxane polymer; and
admixing the polysiloxane polymer with hydroxyalkylsilane which is capable of at least partially dissolving the non-crosslinked polysiloxanes optionally together with a non-polar solvent for the non-crosslinked polysiloxane.

16. The method according to clause 15, wherein said hydroxyalkylsilane has the Formula II or III, wherein the substituents have the same meaning as in clause 1.

17. A method of producing a porous polysiloxane film having a refractive index of 1.4 or smaller, comprising
providing a polysiloxane composition according to any one of clauses 1 to 14;
depositing said composition on a substrate to provide a deposited polysiloxane layer;
heating the polysiloxane layer to cure the polysiloxane component; and
evaporating off the hydroxyalkylsilanes during the heating to form a porous polysiloxane film on the substrate.

18. A polysiloxane film having a thickness of at least 10 nm, said film being obtained by evaporating off the hydroxyalkylsilane for forming a porous siloxane film.

19. The film according to clause 21, comprising α,ω-bis-hydroxylalkyl-oligo(alkylsiloxane) as a flexibilizer.

20. The use of a composition according to any of clauses 1 to 14 for producing an anti-reflective coating film in light guide optics, dielectric stacks, resonator structures, OLED and LED devices and in other optical apparatuses.

21. The use of a composition according to any of clauses 1 to 14 for producing an anti-reflective coating film for nanoparticles and phosphor particles.

22. The use of a composition according to any of clauses 1 to 14 as a low dielectric film in semiconductor devices.

23. The use of a composition according to any of clauses 1 to 14 as a low dielectric film or low-RI film in combination with a capping layer.

INDUSTRIAL APPLICABILITY

The present invention relates to a composition comprising a porous network of polysiloxane with hydroxyalkylsilane, in particular volatile hydroxyalkylsilanes, as flexibilizers which is capable of forming a coating having ultra-low refractive index and ultra-low dielectric constant properties. The composition may be used as a coating for anti-reflective films, light guide optics, dielectric stacks, resonator structures and in other optical apparatuses. In particular, the compositions can used for producing anti-reflective coating film for nanoparticles and phosphor particles, as a low dielectric film in semiconductor devices and as a low dielectric film or low-RI film in combination with a capping layer.

Acronyms List

PTFE Polytetrafluoroethylene (PTFE) Membrane Filters
AR Anti-Reflective
RI Refractive index
DI Dielectric constant
LC/GPC Liquid chromatography/gel permeation chromatography
GC/MS Gas chromatography/mass spectrometry
DI-water deionized water

CITATION LIST

Patent Literature

KR20130075428A
WO2011033611A1
EP1559761A1

The invention claimed is:

1. A polysiloxane composition comprising a polysiloxane and a hydroxyalkylsilane having a boiling point of at least 80° C. at a pressure of up to 1 mbar,
wherein the hydroxyalkylsilane has a formula according to Formula II or Formula III, wherein Formula II has the formula:

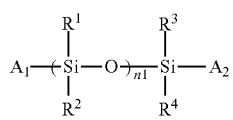

wherein
$A^1$ and $A^2$ are tertiary hydroxyalkyl chains independently selected from $C_6$-$C_{30}$ linear or branched alkyl groups, which optionally contain 1 to 3 double or triple bonds, and which have at least one tertiary hydroxyl group,
n1 is an integer from 1 to 10, and
$R^1$, $R^2$, $R^3$, and $R^4$, are independently selected from linear $C_1$-$C_{10}$ alkyl groups, branched $C_3$-$C_{10}$ alkyl groups, or aryl groups having 5 to 20 carbon atoms, optionally monosubstituted, disubstituted or trisubstituted with a group selected from $C_1$-$C_{10}$ alkyl groups, branched $C_3$-$C_{10}$ alkyl groups, or $C_3$-$C_{10}$ alicyclic groups; and
wherein Formula III has the formula:

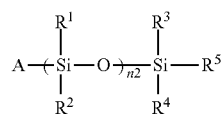

wherein
A stands for a linear or branched alkyl chain having 6 to 30 carbon atoms, optionally having 1 to 3 double or triple bonds, and further comprising at least one tertiary hydroxyl group,
n2 is an integer from 0 to 10; and
$R^1$, $R^2$, $R^3$, $R^4$, and $R^5$ are independently selected from linear $C_1$-$C_{10}$ alkyl groups, branched $C_3$-$C_{10}$ alkyl groups, or aryl groups having 5 to 20 carbon atoms, optionally monosubstituted, disubstituted or trisubstituted with a group selected from $C_1$-$C_{10}$ alkyl groups, branched $C_3$-$C_{10}$ alkyl groups, or $C_3$-$C_{10}$ alicyclic groups.

2. The composition according to claim 1, wherein the composition further comprises an α,ω-bis hydroxyalkyl-oligo(alkylsiloxane), wherein the alkyl groups are selected from the group consisting of linear $C_1$-$C_{10}$ alkyl groups, branched $C_3$-$C_{10}$ alkyl groups, and cyclic alkyl groups having 3 to 11 carbon atoms.

3. The composition according to claim 2, wherein the composition further comprises a siloxane having Formula V:

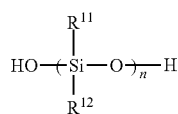

wherein
n is an integer from 1 to 20, and
$R^{11}$ and $R^{12}$ are selected from the group consisting of linear $C_1$-$C_{10}$ alkyl groups, branched $C_3$-$C_{10}$ alkyl groups, and aryl groups having 5 to 20 carbon atoms, the alkyl chains optionally containing unsaturation in the form of double or triple bonds.

4. The composition according to claim 3, wherein in the Formula V, n is an integer from 3 to 15.

5. The composition according to claim 1, comprising, based on 10 parts by weight of the polysiloxane, 3 to 150 parts of the hydroxyalkylsilane.

6. The composition according to claim 2, comprising, based on 10 parts by weight of the polysiloxane, 1 to 150 parts by weight of the α,ω-bis hydroxyalkyl-oligo(alkylsiloxane).

7. The composition according to claim 1, wherein the polysiloxane is a polymer having an average molecular weight ($M_W$) of 500 to 1,500,000 g/mol.

8. The composition according to claim 1, wherein the polysiloxane is obtained by hydrolysis and condensation or co-condensation of silane monomers having Formula IV:

wherein
$Z^1$, $Z^2$, $Z^3$ and $Z^4$ are independently selected from hydrolysable groups or non-hydrolyzable groups, $Z^1$, $Z^2$ and $Z^3$ optionally being one, two or all three non-hydrolyzable groups selected from $C_1$-$C_{10}$ alkyl groups, branched $C_3$-$C_{10}$ alkyl groups, $C_3$-$C_{10}$ alicyclic groups, or aryl groups having 5 to 20 carbon atoms.

9. The composition according to claim 8, wherein at least two monomers of Formula IV are joined with a non-hydrolysable group selected from a divalent $C_1$-$C_{10}$ aliphatic or aromatic group.

10. The composition according to claim 1, wherein the polysiloxane polymer has a refractive index of no greater than 1.45, measured at 632.9 nm.

11. The composition according to claim 1, further comprising a solvent at 1 to 99.9% by weight of the total composition, wherein the solvent is selected from polar, non-polar solvents, protic solvents, or aprotic solvents in an alkyl, ester, ketone, ether or alcohol solvent.

12. The composition according to claim 11, wherein the solvent is a mixture of t-amyl alcohol, methyl isobutyl carbitol, methyl isobutyl ketone, and octamethyltrisiloxane.

13. The composition according to claim 1, further comprising a surfactant of 0.001 to 10% by weight selected from a fluorosurfactant, siloxane surfactant, non-ionic surfactant, anionic or cationic surfactant, or a zwitterionic surfactant.

14. The composition according to claim 1, wherein the hydroxyalkylsilane is free from side groups attached to the silicon atom(s) that are capable of undergoing hydrolysis or condensation under curing conditions.

15. The composition according to claim 1, further comprising 0.001 to 10% by weight of one or more curing catalysts selected from the group consisting of thermo- and light-induced radical catalysts, tin and platinum containing catalysts, alkaline and alkaline releasing catalysts, acid catalyst and thermo- or light-releasing acid catalysts, and fluorine ion releasing catalysts.

16. The composition according to claim 1, wherein the hydroxyalkylsilane has a boiling point of 80 to 250° C. at a pressure of 0.001 to 0.5 mbar.

17. A method of producing a polysiloxane composition, the method comprising:

providing a non-crosslinked polysiloxane polymer; and admixing the polysiloxane polymer with hydroxyalkylsilane which is capable of at least partially dissolving the non-crosslinked polysiloxanes optionally together with a non-polar solvent for the non-crosslinked polysiloxane, said hydroxyalkylsilane having a boiling point 80° C. or more at a pressure of up to 1 mbar, wherein the hydroxyalkylsilane has a formula according to Formula II or Formula III, wherein Formula II has the formula:

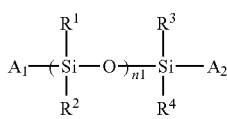

wherein $A^1$ and $A^2$ are tertiary hydroxyalkyl chains independently selected from $C_6$-$C_{30}$ linear or branched alkyl groups, which optionally contain 1 to 3 double or triple bonds, and which have at least one tertiary hydroxyl group, n1 is an integer from 1 to 10, and $R^1$, $R^2$, $R^3$, and $R^4$, are independently selected from linear $C_1$-$C_{10}$ alkyl groups, branched $C_3$-$C_{10}$ alkyl groups, or aryl groups having 5 to 20 carbon atoms, optionally monosubstituted, disubstituted or trisubstituted with a group selected from $C_1$-$C_{10}$ alkyl groups, branched $C_3$-$C_{10}$ alkyl groups, or $C_3$-$C_{10}$ alicyclic groups; and wherein Formula III has the formula:

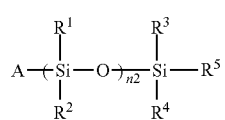

wherein

A stands for a linear or branched alkyl chain having 6 to 30 carbon atoms, optionally having 1 to 3 double or triple bonds, and further comprising at least one tertiary hydroxyl group, n2 is an integer from 0 to 10; and $R^1$, $R^2$, $R^3$, $R^4$, and $R^5$ are independently selected from linear $C_1$-$C_{10}$ alkyl groups, branched $C_3$-$C_{10}$ alkyl groups, or aryl groups having 5 to 20 carbon atoms, optionally monosubstituted, disubstituted or trisubstituted with a group selected from $C_1$-$C_{10}$ alkyl groups, branched $C_3$-$C_{10}$ alkyl groups, or $C_3$-$C_{10}$ alicyclic groups.

18. A method of producing a porous polysiloxane film having a refractive index of 1.4 or less, comprising providing a polysiloxane composition according to claim 1;

depositing said composition on a substrate to provide a deposited polysiloxane layer;

heating the polysiloxane layer to cure the polysiloxane composition; and evaporating off the hydroxyalkylsilanes during the heating to form a porous polysiloxane film having the refractive index of 1.4 or less on the substrate.

19. A polysiloxane composition comprising a polysiloxane and a hydroxyalkylsilane having a boiling point of at least 80° C. at a pressure of up to 1 mbar, and 1 to 99.9% by weight of the total composition of a solvent, wherein the solvent is a mixture of t-amyl alcohol, methyl isobutyl carbitol, methyl isobutyl ketone, and octamethyltrisiloxane.

* * * * *